United States Patent [19]

Klein et al.

[11] 3,791,110
[45] Feb. 12, 1974

[54] APPARATUS FOR PRODUCING GRANULAR SOLIDS FROM THE GASEOUS PHASE SUCH AS BY SUBLIMATION

[75] Inventors: Heinrich Klein; Rudolf Pieper, both of Erlangen; Joachim Sieth, Essen, all of Germany

[73] Assignee: Siemens Aktiengesellschaft, Berlin and Munich, Germany

[22] Filed: June 17, 1971

[21] Appl. No.: 154,050

[52] U.S. Cl. .................. 55/261, 55/82, 55/267, 55/338, 55/418, 55/431, 55/456, 55/459
[51] Int. Cl. ............................................. B01d 45/12
[58] Field of Search..... 55/1, 82, 83, 261, 262, 263, 55/264, 265, 266, 267, 456, 457, 338, 418, 431, 459; 62/12, 13, 14; 165/110, 114

[56] References Cited
UNITED STATES PATENTS

| 1,478,750 | 12/1923 | McElroy | 55/82 X |
|---|---|---|---|
| 1,724,041 | 8/1929 | Plaisted | 55/456 X |
| 2,650,675 | 9/1953 | Yellott | 55/83 |
| 2,849,083 | 8/1958 | Nelson et al. | 55/82 X |
| 3,273,316 | 9/1966 | Ross | 62/14 X |
| 3,273,320 | 9/1966 | Delaune et al. | 55/435 X |
| 3,600,817 | 8/1971 | Klein | 55/261 X |

FOREIGN PATENTS OR APPLICATIONS

| 658,471 | 10/1951 | Great Britain | 55/83 |

OTHER PUBLICATIONS

Aerodyne Development Form No. 9167R1, Aerodyne Development Corporation, 5080 Warrensville Center Road, Maple Heights, Ohio 44137, 2 pages.

*Primary Examiner*—Dennis E. Talbert, Jr.
*Attorney, Agent, or Firm*—Herbert L. Lerner

[57] ABSTRACT

Granular solids are produced (sublimated) from gaseous-phase substances entrained in a gaseous carrier medium. Applied for this purpose is a tornado flow constituted by an outer circulatory flow and an inner rotational (vortex-filament) flow in a cylindrical chamber. The substance to be sublimated, preferably entrained in a gaseous carrier medium, such as air, is introduced into the cylindrical chamber from an axial side thereof to form the inner rotational flow. An auxiliary medium, which may also be air, is supplied into the wall adjacent region of the cylindrical chamber in a direction opposed to that of the rotational flow, so that the flow of auxiliary medium essentially constitutes the circulatory flow. The supply of auxiliary medium is kept at a temperature lower than that of the introduced flow of carrier medium. In the transitional region between the warmer rotational flow and the cooler circulatory flow there occurs a formation of the solids out of the gaseous-phase substance. The solids are discharged, preferably by entrainment in a branched-off portion of the circulatory flow, through an outlet surrounding the incoming flow of carrier medium.

1 Claim, 1 Drawing Figure

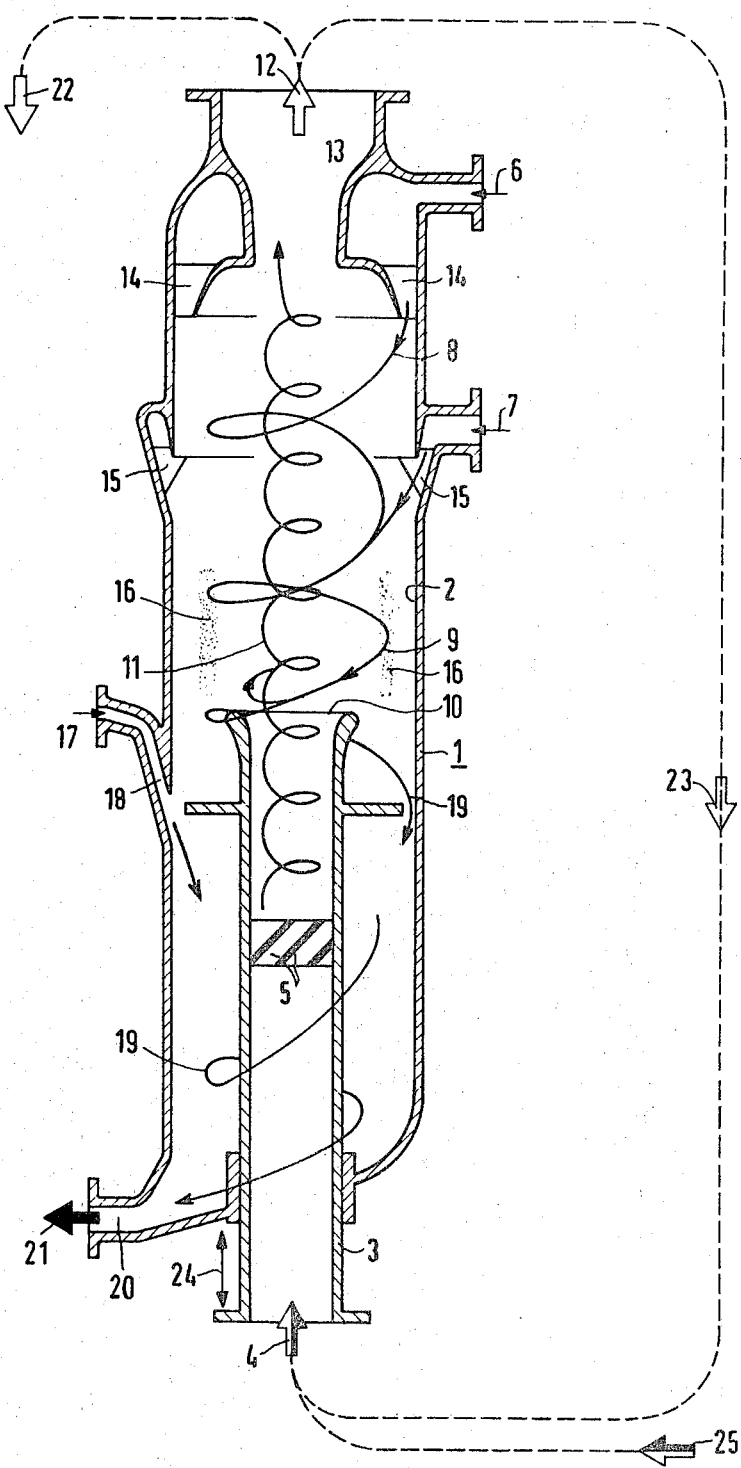

APPARATUS FOR PRODUCING GRANULAR SOLIDS FROM THE GASEOUS PHASE SUCH AS BY SUBLIMATION

Our invention relates to the continuous production of solid substances from gaseous-phase substances which, preferably, are entrained in a gaseous carrier medium. More particularly, our invention relates to, and is especially significant with, the sublimation of solids out of the gaseous phase.

It is an object of the invention to afford the production of organic and inorganic sublimates, for example iodine benzile, caprolactam or phenol, in a simple manner and in continuous operation in the form of solid substances and to separate the sublimated substances from a gas mixture serving as a carrier medium.

According to our invention, we apply for sublimation purposes a so-called tornado or vortex flow composed of an outer circulatory flow and an inner rotational flow, as will be more fully explained hereinafter; and we introduce a substance to be sublimated, preferably entrained in a gaseous carrier into a cylindrical chamber from an axial side thereof so as to form part of the above-mentioned inner, rotational flow along the center axis of the chamber. We further supply an auxiliary medium into the wall-adjacent region of the cylindrical chamber in a direction tangentially inclined and opposed to that of the rotational flow so that the supplied flow of auxiliary medium essentially constitutes the outer, circulatory flow in the chamber. We maintan the supplied flow of auxiliary medium at a temperature lower than that of the introduced flow of sublimating or carrier medium so that in the transitional and relatively quiescent region between the warmer rotational flow and the cooler circulatory flow there occurs a formation of the solids out of the gaseous phase substance. We then discharge the solids, preferably, by entrainment in a branch portion of the cirulatory flow, through an outlet located at the inflow side of the carrier medium.

For an explanation of the phenomena utilized in the method according to the present invention, and with respect to the terminology used in the present disclosure, reference may be had to U.S. Pat Nos. 3,199,268 and 3,226,165. However, for an understanding of the invention, more fully described hereinafter, the following explanatory remarks will be sufficient.

When a liquid in a cylindrical or similarly shaped rotationally-symmetrical vessel is subjected to stirring motion about the vessel axis, the flow produced by the stirrer can be looked upon as being a primary flow. This primary flow releases a secondary flow, the possible formation of tertiary or further derivative flows being ignored. With such a stirring motion, the liquid is not only placed in circulating motion at the outer rim of the vessel, but is also pressed downwardly. The flow lines directed downwardly at the external perimeter then run together on the bottom of the vessel near the vessel center, and the flow then moves upwardly in the center range. After reaching the surface zone, the flow lines again extend from the center radially outwardly.

This flow extending vertically downward and upward as well as toward the center at the bottom and toward the periphery at the top, superimposes itself upon the primary circulatory flow. Consequently, the liquid particles move on the periphery on a helical line downwardly but, when they reach the vessel bottom, the motion converts to an approximately logarithmic spiral along which the particles reach the center whence they rise near the center axis. The ascending motion in the center takes place in form of a rotational motion along a helical line of relatively narrow diameter (vortex filament). On the top surface, the course of the flow again corresponds to a spiral now extending from the center outwardly.

The flow motion just described constitutes a simple form of the one usually designated in fluid mechanics as "circulatory flow above a solid ground" (coffee-cup flow).

The merging of all flow lines in the center of the ground is tantamount to the formation of a vortex sink from which a vortex filament, being a rotational flow, extends upwardly. At a certain height, a vortex source forms itself.

The explanation just given applies equally to gaseous-phase fluids; and while in the foregoing explanatory remarks a mechanical stirring motion is mentioned as generating the primary or circulatory flow component, the circulatory flow may also be excited by other means, such as by injecting a gaseous medium into the tornado-flow vessel from the periphery thereof and in a tangentially inclined direction generally opposed to that of the inner, rotational flow. The latter type of excitation is made use of in the process according to the present invention.

It should be understood that the terms "primary flow" and "secondary flow" are used herein for distinguishing between the two component flows but are not intended to denote anything with respect to importance or technological distinction between the gaseous or vaporous substances which consitute the respective component flows.

As mentioned above, our method of producing solids by such processes as sublimation, comprises introducing the gaseous-phase substance to be sublimated, preferably entrained in or admixed to a carrier medium, into the cylindrical processing chamber from one axial side thereof. It is essential to this method to maintain the gaseous-phase substance or the carrier medium at such a high temperature that the gaseous-phase substance will at first remain in the gaseous state. The auxiliary medium injected laterally through the cylindrical wall of the vessel is kept at a correspondingly lower temperature. In the relatively quiescent merger region between these two media, the sublimate is formed in solid constitution. The sublimation can be controlled, modified and adapted to the desired crystalline requirements by varying or selecting the quantity and temperature of the primary flow and its share of substance to be sublimated, as well as by varying or adjusting the quantity and temperature of the secondary in-flow which produces the above-mentioned stirring action and thereby the circulatory component flow. A corresponding control and regulation is applicable with respect to any further additional supply or injection of media, as well as their flow direction and flow speed. Such a control is obtained, for example, by correspondingly shaping and arranging the injection nozzles or other in-flow openings of the processing vessel. Furthermore, the entire method can be performed under variable pressure conditions so as to exert the desired effect upon the structure and particle formation of the crystals, for example the size of the crystals.

The formation of the solids in the merger zone within the tornedo flow according to the invention is further advantageous because the solids being produced are not in contact with structural walls as the merger zone is located at a distance from the wall of the vessel, the distance being dependent upon parameters of the tornedo flow. This is important especially in cases where it is desired or necessary to prevent a lodging of crystalline coatings or clogging of apparatus by solid substances evolving out of the gaseous flow substances.

The solid substances may dwell any desired length of time in the merger zone between rotational and circulatory flows in the form of freely floating rotating rings or clouds of particles. Aside from the known and generally utilized chemical ways of affecting the size of the crystals being formed, for example temperature differences or pressures, the method of the invention affords adjusting at will the just-mentioned dwell time in the recrystallizing zone so as to obtain the solids in a form classified in accordance with grain sizes. With the aid of a portion of the circulatory, potential flow, branched off at a point ahead of the locality where the potential flow converts to the rotational flow (that is at or near the above-mentioned vortex sink) the formed solid particles can be discharged at any time, and the rate of discharge can be determined and controlled in any desired manner.

The invention will be further described with reference to the accompanying drawing in which the single illustration shows in section an embodiment of apparatus for performing the above-described method, only the essential parts of the apparatus being illustrated in a simplified and schematic representation.

The hollow chamber 1 in which the solids are being formed, is provided by a substantial cylindrical vortex (tornado flow) vessel whose wall 2 has an inner surface which is as smooth as feasible. Nozzles 14, 15, as well as any other means for supplying gaseous-phase substances, protrude as little as possible or not at all into the cylindrical space proper but are smoothly flush with the inner wall surface. Only at the axial end sides there are located certain inlet and outlet ducts that protrude into the processing chamber. Thus, a supply tube 3 enters from below into the vessel in coaxial relation thereto and is axially displaceable as is indicated by a double arrow 24. The tube 3 serves to supply the carrier medium, such as air, with the gaseous-phase substance, for example phenol, to be sublimated. The inlet tube 3 preferably consists of heat insulating material or is made heat insulating in any other suitable manner, for example by giving it a double-walled design. The heat insulation assists in maintaining high temperatures in the interior of the inlet tube 3 to prevent the formation of solids at these localities.

On the other hand, means may be provided for keeping the wall of the chamber as cool as feasible. Suitable are means for dissipation of heat or for applying an additional coolant. Such cooling serves to prevent any reverse reactions from the solid back to the vaporous consitution.

The carrier medium arriving in the direction of the arrow 25, enters in the direction of the arrow 4 into the apparatus and can be placed in rotary motion by correspondingly shaped vanes 5 or other guides. If desired, a rotational motion may be imparted to the incoming carrier medium by means of a propelling device such as a flower, which will also have the effect of accelerating the in-flow of carrier medium. The carrier medium than progresses as a rotational flow 11 in the axially upward direction.

It will be understood that the rotational, inner flow component is represented schematically by only one flow line 11, and that the outer, circulatory component of flow is analogously represented by only one flow line 8, 9.

For exciting the circulatory flow 8, 9 in the illustrated embodiment, a cold or cooled medium, for example air, is injected through one or several inlets in the form of ring-slot nozzles or the like in a downwardly inclined tangential direction generally opposed to the direction of the rotational flow 11, which takes place in the vicinity and along the cylinder axis of the apparatus. The injection of auxiliary medium, here briefly called secondary air, takes place at the inlet localities 6 and 7. The secondary air flow travels in the form of a circulatory flow along the path symbolized by the above-mentioned flow lines 8, 9. The generally and downwardly directed helical flow occurs in the wall-adjacent region of the tornado chamber. Above the opening 10 of the inlet tube 2, 3, the circulatory flow 9 converts to the rotational flow 11 which is comparable to a vortex filament and which rotates in the same sense as the circulatory flow. The rotation, as the case may be, is augmented by the pre-twisting caused by the vanes 5 or other twisting devices. The rotational flow 11 leaves the apparatus in the direction of the arrow 12 through outlet 13 and is discharged as indicated by the arrow 22. If desired, and as denoted by arrow 23, a feed-back or recycling line back to the inlet 4 may be provided. The secondary-air inlets 6 and 7 may be equipped, as illustrated, with a circular group of vanes 14, 15 for augmenting the excitation of the circulatory flow component.

In the merger region between the relatively hot rotational flow and the relatively cool circulatory flow, that is in the mixing zone 16, the gaseous sublimate is cooled so that the solid constitution will crystalize out of the gaseous phase. The solids collect in a ring-shaped cloud within the merger zone 16 without touching the vessel walls 2.

The solids thus formed are transported out of the processing vessel. This can be effected by having the solids entrained in a branch 19 of the circulatory flow, or by applying a current of air injected in the direction of the arrow 17 through a nozzle 18. A portion at the bottom of the rotating ring of solids in zone 16 is then continuously peeled off and passes as a filament along the path 19 downwardly around the inlet tube 3 and through a suitable outlet 20 at the lower end of the processing equipment, leaving this equipment in the direction indicated by an arrow 21.

There are several ways of obtaining different grain compositions. For example the number of the secondary air supplies, their size and throughput, as well as the temperature of the secondary air, can be modified for this purpose. The angles of inclination of the injection nozzle can also be varied in order to obtain, from case to case, shorter or longer dwell times of the substances in the crystallization region. Furthermore, as indicated by the double arrow 24, the height adjustment of the inlet tube 3 may be varied to permit a change in axial length of the crystallization zone 16. It is further possible to take advantage of the gas quantity introduced through the nozzle 18 in order to slow down or speed up the discharge of the solids. Moreover, the transport air nozzle 18 itself, or several such nozzles, may be given different dimensions in order to more rapidly or more slowly transport the solids out of the crystallization zone so that an aftergrowth of the crystals in the cool zone is either permitted, aggravated or entirely prevented, as may be desired. It is of advantage for such purposes to supply as much transportation gas through inlet 17 that the lodging of crystals in the discharge space around the inlet tube 3 is prevented and the solids are discharged from the apparatus essentially in floating condition.

To those skilled in the art, it will be obvious from a study of this disclosure that our invention permits of various modifications and of applications to various substances other than those particularly described or illustrated herein without departing from the essential features of our invention and within the scope of the claims annexed hereto.

We claim:

1. Apparatus for producing granular solids from gaseous-phase substances, comprising a vessel that forms a chamber for maintaining a tornado-flow essentially constituted by an outer circulatory flow and an inner rotational flow, first supply means for introducing a heated gaseous carrier medium with the gaseous substance to be sublimated into the cylindrical chamber from an axial side thereof so as to form part of said inner rotational flow, said first supply means comprising a heat insulating inlet tube formed of insulating material, having a smaller diameter than said chamber and protruding into said chamber from one axial end thereof, said inlet tube being axially shiftable with respect to said vessel having inner rotational flow guide means disposed therein, second supply means for injecting an auxiliary medium into the wall-adjacent region of the cylindrical chamber in a direction opposed to that of said rotational flow so that the flow of said auxiliary medium essentially constitutes said circulatory flow, said second supply means comprising duct means tangentially inclined toward and at different axial heights with respect to said inlet tube, means including said inlet duct for maintaining said supplied flow of carrier medium at a temperature higher than that of the introduced flow of said auxiliary medium so that in the transitional region between the warmer rotational flow and the cooler circulatory flow there occurs a formation of the solids out of the gaseous-phase substance, said vessel having a central gas outlet at its other axial end disposed around said inlet tube to form an annular outlet gap, inlet gas means for introducing a gas flow downwardly around said inlet tube into a branch of said vessel for urging the discharge of solids from said transitional region to said outlet gap, and a recycling line disposed from said gas outlet to said inlet tube.

* * * * *